US010628680B2

(12) United States Patent
Babenko et al.

(10) Patent No.: US 10,628,680 B2
(45) Date of Patent: Apr. 21, 2020

(54) EVENT-BASED IMAGE CLASSIFICATION AND SCORING

(71) Applicant: DROPBOX, INC., San Francisco, CA (US)

(72) Inventors: Boris Babenko, San Mateo, CA (US); Nils Peter Welinder, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/690,104

(22) Filed: Aug. 29, 2017

(65) Prior Publication Data

US 2018/0005040 A1    Jan. 4, 2018

Related U.S. Application Data

(63) Continuation of application No. 14/453,284, filed on Aug. 6, 2014.

(51) Int. Cl.
*G06K 9/00* (2006.01)

(52) U.S. Cl.
CPC ................ *G06K 9/00744* (2013.01)

(58) Field of Classification Search
CPC .................................. G06K 9/00744
See application file for complete search history.

(56) References Cited

U.S. PATENT DOCUMENTS

| 6,671,405 | B1 * | 12/2003 | Savakis | G06K 9/00234 |
| | | | | 358/527 |
| 7,809,197 | B2 * | 10/2010 | Fedorovskaya | G06K 9/00255 |
| | | | | 358/1.14 |
| 8,132,096 | B1 * | 3/2012 | Widdowson | G06T 11/60 |
| | | | | 382/209 |
| 8,180,112 | B2 * | 5/2012 | Kurtz | G06K 9/00288 |
| | | | | 382/103 |
| 8,254,647 | B1 * | 8/2012 | Nechyba | G06K 9/00248 |
| | | | | 382/118 |
| 8,311,364 | B2 * | 11/2012 | Cerosaletti | G06K 9/036 |
| | | | | 382/112 |
| 8,553,949 | B2 | 10/2013 | Steinberg et al. | |
| 8,566,746 | B2 | 10/2013 | Chuat et al. | |

(Continued)

FOREIGN PATENT DOCUMENTS

WO    WO2011/051091    5/2011

OTHER PUBLICATIONS

U.S. Appl. No. 14/453,284, Oct. 7, 2015, Office Action.

(Continued)

*Primary Examiner* — Sean T Motsinger
(74) *Attorney, Agent, or Firm* — Keller Jolley Preece (57) ABSTRACT

Embodiments of the present invention analyze and score each image associated with a group to determine representative image or images for the group. Such analysis can include detecting objects shown in the images, determining the quality of the images, and/or contextually analyzing the images as a group. In some embodiments, each image in a group (e.g., an event) of images can be analyzed by one or more image analysis modules that calculate a score for the image based on a different image characteristic. A composite image score can then be calculated based on the various image characteristic scores to identify the image or images to be used as to represent the group.

20 Claims, 7 Drawing Sheets

(56) References Cited

U.S. PATENT DOCUMENTS

| | | | | |
|---|---|---|---|---|
| 8,631,322 B2* | 1/2014 | Isomura | G06F 17/3028 | 348/231.2 |
| 8,768,063 B2* | 7/2014 | Sugita | G11B 27/28 | 382/118 |
| 8,873,851 B2* | 10/2014 | Fedorovskaya | G06F 17/30247 | 382/170 |
| 8,913,152 B1* | 12/2014 | Carceroni | G06T 11/60 | 348/222.1 |
| 9,014,510 B2* | 4/2015 | Fedorovskaya | G06K 9/00677 | 382/305 |
| 9,715,731 B2* | 7/2017 | Desnoyer | G06T 7/55 | |
| 2001/0041020 A1* | 11/2001 | Shaffer | H04N 1/00132 | 382/305 |
| 2003/0084065 A1* | 5/2003 | Lin | G06F 17/30265 | |
| 2003/0154190 A1* | 8/2003 | Misawa | G06F 17/30265 | |
| 2003/0156140 A1* | 8/2003 | Watanabe | G06F 3/0481 | 715/810 |
| 2004/0022522 A1* | 2/2004 | Terada | G11B 27/034 | 386/248 |
| 2005/0243381 A1* | 11/2005 | Hill | H04N 1/00132 | 358/453 |
| 2005/0244033 A1* | 11/2005 | Ekin | G01S 3/7864 | 382/103 |
| 2006/0017820 A1* | 1/2006 | Kim | H04N 5/772 | 348/231.2 |
| 2006/0271691 A1* | 11/2006 | Jacobs | H04N 1/00132 | 709/228 |
| 2007/0174872 A1* | 7/2007 | Jing | G06F 17/30244 | 725/46 |
| 2008/0012987 A1* | 1/2008 | Hirata | G06F 17/30265 | 348/563 |
| 2009/0161962 A1 | 6/2009 | Gallagher et al. | | |
| 2009/0174786 A1* | 7/2009 | Joseph | H04N 5/232 | 348/222.1 |
| 2010/0020224 A1* | 1/2010 | Hattori | G06K 9/00221 | 348/333.11 |
| 2010/0095353 A1* | 4/2010 | Athsani | G06F 17/3089 | 726/4 |
| 2010/0104266 A1* | 4/2010 | Yashiro | G06K 9/00295 | 386/201 |
| 2010/0278396 A1* | 11/2010 | Mitsuhashi | G06F 17/30247 | 382/118 |
| 2011/0081088 A1* | 4/2011 | Xiao | G06K 9/00664 | 382/218 |
| 2012/0076427 A1* | 3/2012 | Hibino | G06K 9/00671 | 382/218 |
| 2012/0106559 A1 | 5/2012 | Kim et al. | | |
| 2012/0106859 A1* | 5/2012 | Cheatle | G06T 11/60 | 382/225 |
| 2012/0284751 A1* | 11/2012 | Kim | H04N 5/76 | 725/41 |
| 2013/0120595 A1* | 5/2013 | Roach | H04N 5/225 | 348/207.1 |
| 2013/0279811 A1* | 10/2013 | Cheng | G06K 9/00228 | 382/195 |
| 2013/0336543 A1* | 12/2013 | Bennett | G06K 9/6267 | 382/112 |
| 2014/0071068 A1* | 3/2014 | Shih | G06F 3/04883 | 345/173 |
| 2014/0153827 A1* | 6/2014 | Krishnaswamy | G06T 7/0002 | 382/170 |
| 2014/0181123 A1* | 6/2014 | Tuffet Blaise | G06F 17/30038 | 707/749 |
| 2014/0258381 A1* | 9/2014 | Tani | H04L 67/28 | 709/203 |
| 2014/0289594 A1* | 9/2014 | Iampietro | G11B 27/105 | 715/202 |
| 2014/0334797 A1* | 11/2014 | Lee | G11B 27/28 | 386/241 |
| 2014/0347511 A1* | 11/2014 | Rodriguez-Serrano | H04N 5/23222 | 348/222.1 |
| 2014/0365905 A1* | 12/2014 | Chedeau | G06Q 50/01 | 715/744 |
| 2015/0015735 A1* | 1/2015 | Rav-Acha | H04N 5/23219 | 348/222.1 |
| 2015/0043831 A1* | 2/2015 | Arfvidsson | H04L 67/10 | 382/228 |
| 2015/0062334 A1* | 3/2015 | Dickinson | H04N 7/181 | 348/143 |
| 2015/0095825 A1* | 4/2015 | Yamamoto | G06F 3/0486 | 715/769 |
| 2015/0110407 A1* | 4/2015 | Sinha | G06K 9/6267 | 382/225 |
| 2015/0143236 A1* | 5/2015 | Tena Rodriguez | G06F 17/212 | 715/273 |
| 2015/0154228 A1* | 6/2015 | Vanco | G06F 17/30274 | 707/724 |
| 2016/0042249 A1 | 2/2016 | Babenko et al. | | |
| 2016/0162482 A1* | 6/2016 | Pesavento | G06K 9/46 | 707/728 |

OTHER PUBLICATIONS

U.S. Appl. No. 14/453,284, Jun. 2, 2016, Office Action.
U.S. Appl. No. 14/453,284, Oct. 6, 2016, Office Action.
U.S. Appl. No. 14/453,284, Jun. 1, 2017, Office Action.
U.S. Appl. No. 14/453,284, Jan. 25, 2018, Office Action.
U.S. Appl. No. 14/453,284, Sep. 21, 2017, Office Action.
U.S. Appl. No. 14/453,284, Jul. 16, 2018, Notice of Allowance.

* cited by examiner

EVENT-BASED IMAGE CLASSIFICATION AND SCORING

CROSS REFERENCE TO RELATED APPLICATIONS

This application is a continuation of U.S. application Ser. No. 14/453,284, filed Aug. 6, 2014. The aforementioned application is hereby incorporated by reference in its entirety.

BACKGROUND

The present disclosure relates generally to content management systems and services and in particular to event-based image classification and scoring.

In recent years, online content management services have increased in popularity. One use of such services is for storing, organizing, and sharing digital photographs and other images. Such services can organize a user's photos by dividing them into events (e.g., by date). All or a portion of the photos associated with an event can be displayed in a user interface. However, for events with many photos, showing all of the photos can make it difficult for the user to navigate between events. As such, one or more photos from the event can be selected to represent the event. These featured photos are generally selected randomly, or based on very basic image metadata (e.g., use the most recent photo from an event or the first photo from an event). These limited approaches provide for a less than optimal user experience.

SUMMARY

Embodiments of the present invention analyze and score each image associated with a group to determine representative image or images for the group. Such analysis can include detecting objects shown in the images, determining the quality of the images, and/or contextually analyzing the images as a group. In some embodiments, each image in a group (e.g., an event) of images can be analyzed by one or more image analysis modules that calculate a score for the image based on a different image characteristic. A composite image score can then be calculated based on the various image characteristic scores to identify the image or images to be used as to represent the group.

Accordingly, certain embodiments of the present invention relate to systems and methods for event-based image classification and scoring. Such systems and methods can allow users to more easily navigate and manage their image (or other content item) library, by highlighting the highest scoring images from their library.

In some embodiments, a system can process images using various image analysis modules. Each image analysis module can correspond to a different image characteristic being analyzed (e.g., image quality, object detection, etc.) and each image analysis module can compute an image characteristic score. Based on the image characteristic scores, a composite image score can be computed. The composite image score can then be used to, e.g., select a representative image from a group of images. For example, images that belong to a particular event may be compared to one another, and the image or images with the highest composite image score may be identified. These images may then be displayed in a user interface as representative of the event.

In some embodiments, image composite scores may be used to provide real-time or near real-time recommendations to the user. When an image is captured by a client device, it can be automatically uploaded to an online content management service. The online content management service can analyze the image to determine a composite image score and a recommendation can be returned to the client device based on the composite image score. For example, based on the composite image score relative to a threshold value, a recommendation may be sent to the user to retake the image, delete the image, or change the settings on the client device (e.g., by activating or deactivating a flash).

The following detailed description together with the accompanying drawings will provide a better understanding of the nature and advantages of the present invention.

DETAILED DESCRIPTION

Certain embodiments of the present invention relate to systems and methods for classifying and scoring images stored in an online content management service. Although embodiments of the present invention are generally described with reference to images (including but not limited to digital photographs, 3D images; virtual and/or augmented reality digital photographs and/or scenes; computer generated images; and other image files), embodiments of the present invention can be similarly applied to other content items (including but not limited to text documents; email messages; text messages; other types of messages; media files such as photos, videos, and audio files; and/or folders containing multiple files) stored in an online content management service.

As described above, prior art image services can enable users to store, organize, and share digital photographs and other images. Such services can organize a user's photos by dividing them into groups (e.g., by date), and a user can view their photos in a gallery view. However, as a user's library of images grows larger, such a gallery can be difficult to navigate if all images are displayed. Prior art solutions have attempted to address this problem by displaying a preview, such as a few images, associated with each group. Such previews are typically random samples of images or selected based on basic metadata information (such as first added or last added images). This means that the preview cannot present relevant information about the other images in the group, forcing the user to navigate through each group when searching for a particular image.

Embodiments of the present invention, address this problem by analyzing each image associated with a group to determine an image or images that represent the group, and provide a useful preview for the user. Such analysis can include detecting objects shown in the images, determining the quality of the images, and/or contextually analyzing the images as a group. In some embodiments, each image in a group (e.g., an event) of images can be analyzed by one or more image analysis modules that calculate a score for the image based on a different image characteristic. A composite image score can then be calculated based on the various image characteristic scores to identify the image or images to be used as to represent the group.

In some embodiments, image analysis modules can include object detection modules, such as a face detection module. Each object detection module can output a tuple, including a position, area, and confidence value, for each object detected in the image. These tuples can then combined to generate an overall object detection score for the image. For example, a face detection score can be calculated as the sum of the area of each detected face multiplied by the confidence value. Therefore a high score will indicate a large portion of the image (e.g., a large percentage of the image's pixels) includes a face or faces. In an embodiment with a single object detection module, the image with the highest object detection score can be displayed as representative of a group of images.

As described further below, additional image analysis modules can be used to score images based on a number of different image characteristics, such as a smile detection module, eye detection module, image quality analysis module (e.g., blur analyzer, color analyzer, scene analyzer), and other image analysis modules. Each image analysis module can produce a score, and these scores can be combined into a composite image score that characterizes the image. In some embodiments, the composite image score can be calculated based on these scores using a linear function or a non-linear function.

Examples of systems and methods for image classification and scoring will now be described.

Figure 1:
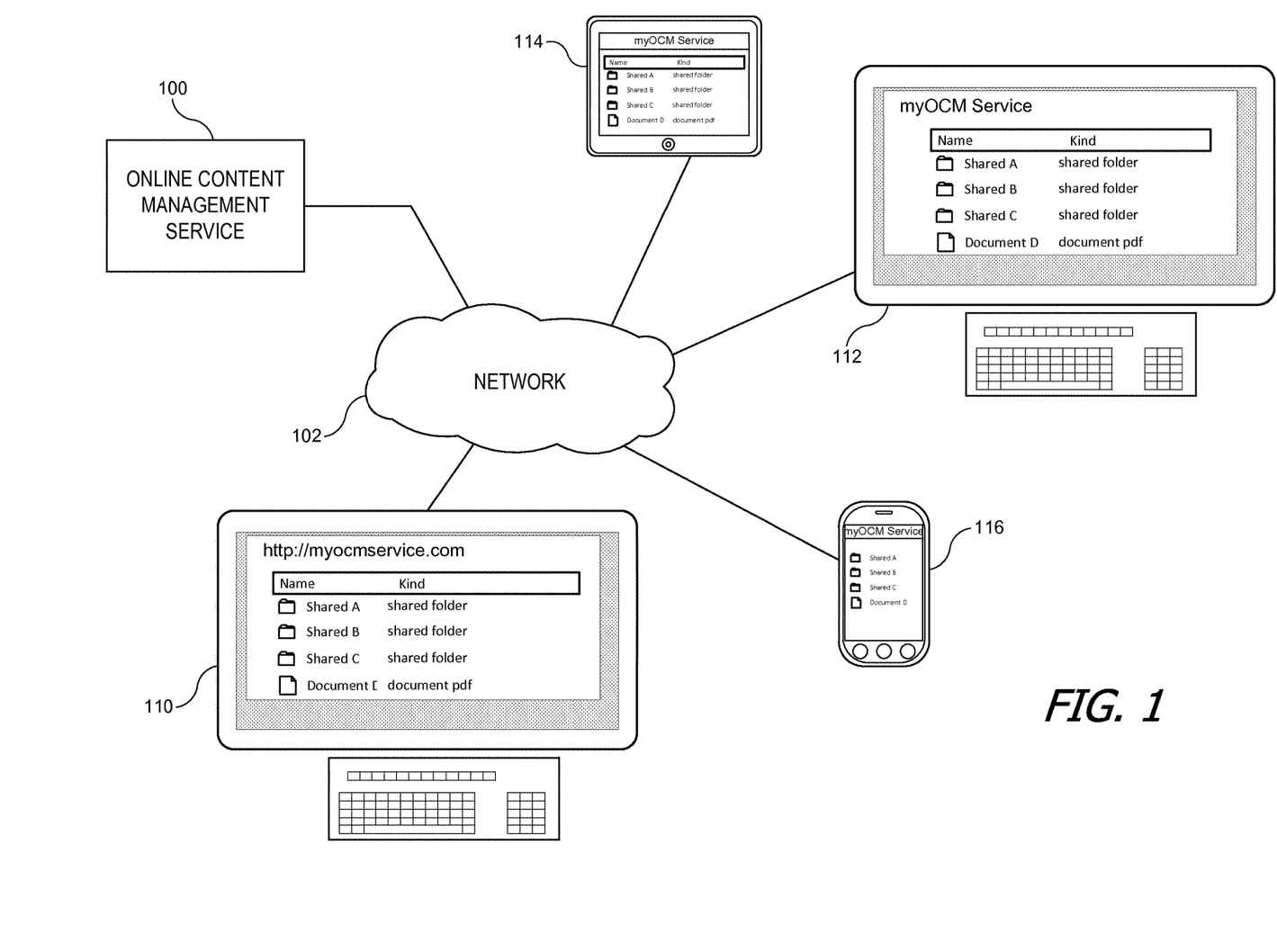
FIG. 1 shows clients accessing an online content management service according to an embodiment of the present invention.

FIG. 1 shows clients accessing an online content management service 100 according to an embodiment of the present invention. Online content management service 100 can include, for example, a file storage service, a file sharing service, a social media service that allows users to post messages and/or other content, and so on. Online content management service 100 can be hosted on servers maintained by a service provider and accessed via a network 102, such as the Internet.

Users can access online content management service 100 by operating various clients 110, 112, 114, 116. As used herein, a "client" refers generally to a combination of computer hardware and software that enables a user to interact with online content management service 100. For example, client 110 can be a desktop or laptop computer executing a web browser (e.g., Internet Explorer, Google Chrome, or Safari) that communicates with online content management service 100 using web protocols such as HTTP (Hypertext Transfer Protocol). Client 112 can be a desktop or laptop computer executing an application program provided by the provider of online content management service 100. In some instances where the online content management service provides access to files, the application program can allow files hosted on a server to appear to exist within a filesystem structure associated with the client computer's operating system. It should be noted that in some instances the same client computer can execute both a web browser and a desktop application program; accordingly, it is to be understood that a single physical device can implement one or more clients. In some embodiments, a when a user accesses online content management service 100 using a client, the user can authorize the client with the user's account. A user account can store a record of each client that is authorized with the user account, including identifying information from the client such as an IP address, MAC address, phone number, or other information. Authorizing a device with a user account can enable faster and/or simplified access to online content management service 100, client notifications, and other features.

Other examples of clients include mobile devices, e.g., tablet computer 114 and mobile phone 116, which can execute application programs (also referred to as "apps") that communicate with online content management service 100. At various times, a user can be interacting with one or more of clients 110, 112, 114, 116.

Clients 110, 112, 114, 116 can be user-operated computing devices that can execute software to interact with online content management service 100. Various types of computing devices can be used, including desktop computers, laptop computers, tablet computers, smart phones, wearable computing devices, personal digital assistants, and so on. By way of example, client 116 can be a smart phone that can execute an application program (also referred to as an app) to communicate with online content management service 100 via network 102. The app can be provided by a provider of online content management service 100 and can be customized for image storage. For example, a user interface of client 116 can be configured to allow the user to capture digital photographs using a built-in camera and automatically upload the digital photographs to online content management service 100. In some embodiments, the application can inspect content items stored on client 116 to identify images (e.g., based on file type) and automatically upload the images to online content management service 100. A user interface of client 116 can also be configured to allow the user to define "events" and to associate images with the events. As used herein, events can refer to subsets of images that share common features. For example, digital photographs captured while the user is on vacation can be grouped into a vacation event. Images can also be grouped based on their contents, such as friends, pets, food, etc. Similarly, unorganized images that are not associated with any preexisting event can be grouped into an "unorganized" event and/or can be grouped based on the day the image was captured (e.g., into "daily" events). The user can select a "gallery" view of images stored in online content management service 100 and online content management service 100 can display an event-based gallery view of the user's images, e.g., by performing event-based image classification and scoring operations as described herein.

Figure 2:
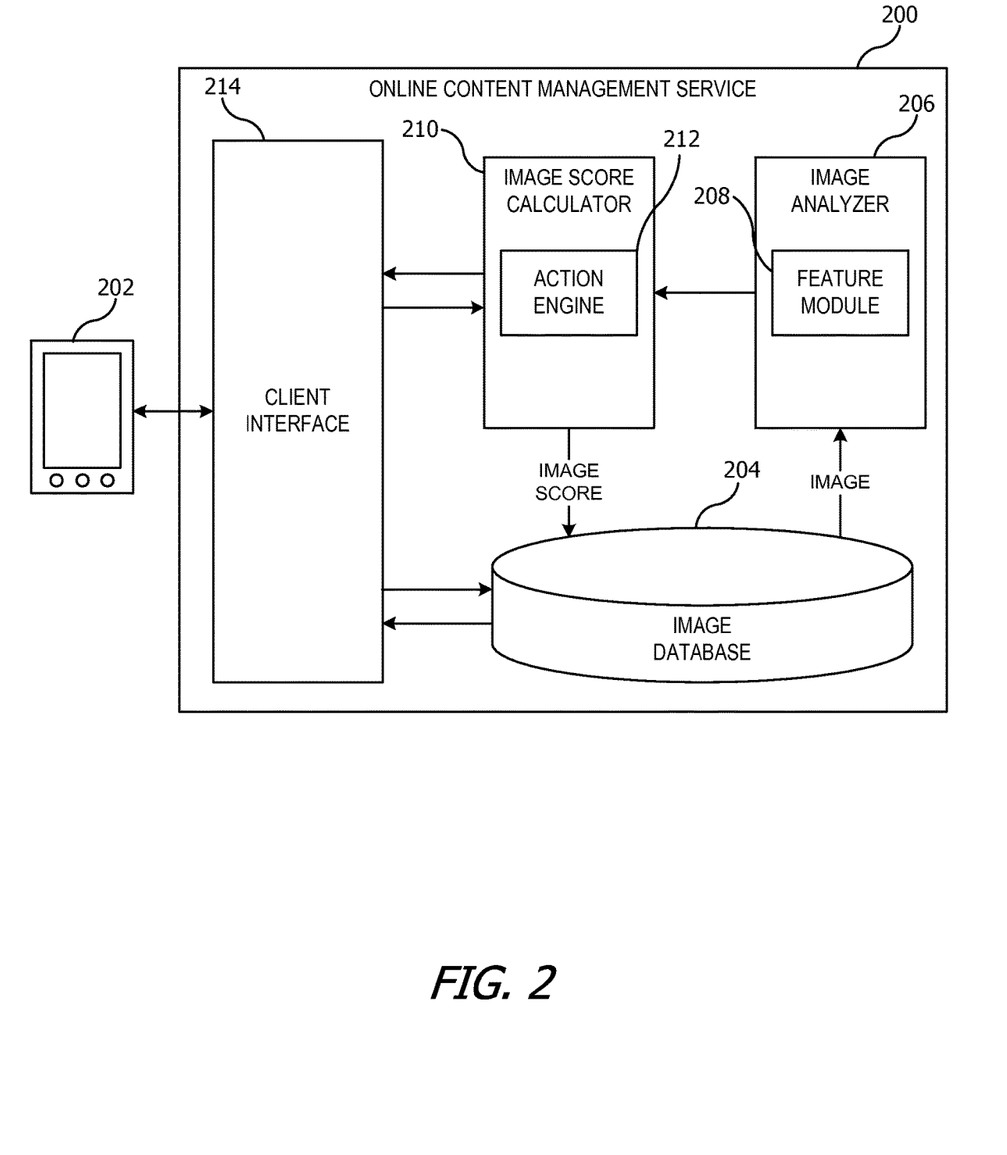
FIG. 2 shows a block diagram of an online content management service according to an embodiment of the present invention.

FIG. 2 shows a block diagram of online content management 200 service according to an embodiment of the present invention. Online content management service 200 can implement online content management service 100 of FIG. 1. For example, online content management service 200 can provide content management services to a client 202 (e.g., implementing any of clients 110-116 of FIG. 1). Online content management service 200 can include an image database 204 that stores images uploaded from client 202. In some embodiments, image database 204 can include images receives from many different users, using different client devices. In some embodiments, image database 204 can represent an interface to a distributed database system that includes multiple storage nodes (e.g., computer systems including processors, memory, and disk space configured to provide storage services to online content management service 200). User content items (including images) can be stored on dedicated storage nodes within image database 204 or can be stored together with other users' content items on the same storage nodes.

Online content management service 200 can include a client interface 214, image classifier 210, and an image analyzer 206. Client interface 210 can communicate with multiple instances of client 202 (e.g., clients associated with different users and/or multiple clients associated with the same user). For instance, client interface 210 can receive an image uploaded by client 202, calculate a score for the image, and send processing instructions and/or recommendations to client 202 based on the score.

Image analyzer 206 can include functional blocks or modules configured to perform various operations on image files received from client 202 and/or stored in image database 204. For example, feature module 208 can include detection modules that are configured to detect particular objects in an image (e.g., a face detection module, food detection module, animal detection module, etc.). Feature module 208 can include a document detection module that is configured to detect text or other indicia of a document, such as scan alignment points, letterhead, etc. In some embodiments, feature module 208 can include object analyzer modules that are configured to analyze objects that are identified in an image. For example, if an image is analyzed by a face detection module and determined to include a face, a smile detection module can then be used to analyze the identified face. Other object analysis modules can include and eye detection module configured to determine whether the eyes of an identified face are open or closed, and an identity detection module configured to determine an identity associated with the identified face. In some embodiments, feature module 208 can include behavior analysis modules that are configured to detect how users interact with the images. For example, a view analysis module can identify how many times an image has been viewed and/or how long an image is viewed per view. An activity analysis module can determine how often the image has been shared by a user, viewed by a user, commented on by a user, or otherwise interacted with by a user. In some embodiments, the activity analysis module can monitor activity by the user who uploads the image as well as other users who interact with the image.

In some embodiments, image score calculator 210 can receive the output of each feature module 208 and calculate a composite score for the image. The composite score can be stored in image database 204 with the image and/or can be stored in a separate score repository along with an identifier corresponding to the scored image. An image score can also be returned to client device 202 via client interface 214 when a picture is uploaded. For example, if a user takes a digital photograph using client device 202, the digital photograph can be automatically uploaded to image database 204 via client interface 214. The digital photograph can be analyzed and scored when it is received and the score can be returned to client 202. Based on the score, an action engine 212 can generate an action recommendation message to display on client 202 with the score. For example, if the score is low because the image is of poor quality the action recommendation message can include a recommendation to the user to retake the digital photograph.

In some embodiments, threshold values can be maintained by online content management service 200 for each image analysis module and for each event. For example, a threshold value for an event can be used to determine an image, or images, to display as representative of the event, based on the image's composite image score. Each image analysis module threshold can be used to trigger action engine 212 to generate an action recommendation message related to the image characteristic analyzed by the image analysis module. For example, the recommendation can include specific recommendations to correct the feature or features that are lowering the score. For example, if the image's score is low because the image is dark and blurry, the recommendation can suggest that the user check the flash function of client 202.

It will be appreciated that online content management service 200 is illustrative and that variations and modifications are possible. For example, other image analysis and scoring modules and/or operations can be provided. In some embodiments, online content management service 200 can include training modules that can receive feedback on scores from users (such as a user using client 202 and/or other users of online content management service 200) and adjust the scoring processes used by each feature module 208 and image score calculator 210. Additional details of such embodiments are described below with respect to FIG. 3.

Figure 3:
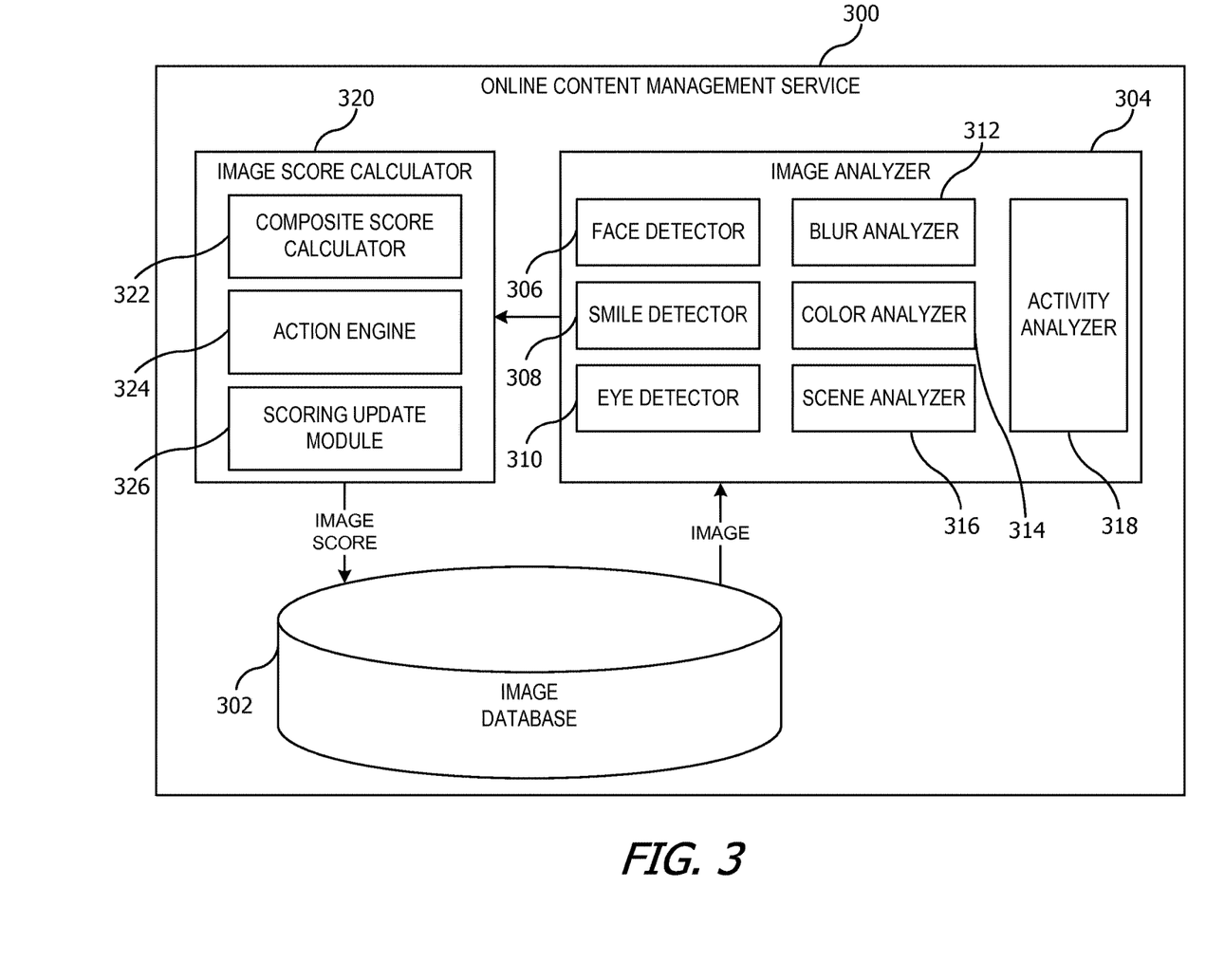
FIG. 3 shows a more detailed block diagram of a an online content management service according to an embodiment of the present invention.

FIG. 3 shows a more detailed block diagram of a an online content management service according to an embodiment of the present invention. In the embodiment shown in FIG. 3, online content management service 300 includes image database 302, image analyzer 304 and image score calculator 320. Image analyzer 302 includes several different feature modules that are each configured to analyze a different feature of an image. Broadly, the feature modules can include object detectors that are configured to detect the presence or absence of a particular object in an image, object analyzers that are configured to analyze the detected objects, and image-level analyzers configured to analyze the quality of an image (e.g., image blurriness, color balance, light balance, etc.). In some embodiments, an activity analyzer can determine how popular an image is based on how users interact with the image and assign a score corresponding based on the image's popularity.

As shown in FIG. 3, image analyzer 304 includes a face detection module 306. Face detection module 306 is an object detection module configured to identify faces in an image. In some embodiments, face detection module 306 can use facial detection algorithms as are known in the art. In some embodiments, face detection module 306 can be trained to detect faces using past images uploaded by the user. Facial detection module 306 can analyze an image and output a position, width, height, and confidence value for an identified face or faces. When calculating a score, facial detection module 306 can, e.g., assign a position value based on whether the face is centered and an area value based on the proportion of pixels of the image the face or faces occupy. In some embodiments, the position value, area value, and confidence value can be combined to generate a facial detection score.

When an object detection module positively identifies an object in an image, the image can automatically be analyzed by related object analysis modules. For example, when face detection module 306 identifies a face in an image (e.g., with a confidence value higher than a threshold value) smile detection module 308 and eye detection module 310 can each process the image. Photographs of people smiling, and where everyone in the photo has their eyes open, are generally preferred. As such, two photographs that both feature a subject's face may not be equally desirable to the viewer. Additional analysis modules, such as smile detection module 308 and eye detection module 310, can be used to analyze the detected face and determine a more precise score for the image.

Smile detection module 308 can be configured to detect whether the face detected in the image is smiling and assign a corresponding score. Smile detection module 308 can use an edge detection algorithm or other appropriate process to identify the shape of a mouth on the detected face and compare the detected shape to a smile template shape. The closer the detected smile matches the smile template, the higher the score output by smile detector 308. Eye detection module 310 can be configured to identify eyes on the detected face and determine whether the eyes are open or closed. Eye detection module 310 can use similar edge detection or pattern matching algorithms to determine whether a subject's eyes are open, with higher scores being assigned to images in which all detected faces are associated with open eyes.

Image analyzer 304 also includes image quality analysis modules, including blur analysis module 312, color analysis module 314, and scene analysis module 316. Blur analysis module 312 can determine the blurriness of an image, e.g., using an edge detection algorithm. However, general blurriness alone may not indicate an image's quality. For example, an image with a small depth of field can focus on a subject while the rest of the image is out of focus. Assuming the intended object is in focus, an otherwise blurry image should receive a high score. As such, in some embodiments, blur analysis module 312 can determine areas of an image that are in focus and compare these areas to areas identified by object detection modules. For example, blur analysis module 312 can determine an area of focus at position $(X_f, Y_f)$ and face detection module 306 can detect a face at position $(X_o, Y_o)$. Blur analysis module can compare the positions and, if the positions are within a threshold distance of one another, provide a high score to the image. Other image analysis modules can include a color analysis module configured to determine the color balance of an image.

In some embodiments, a contextual analysis of an image can be performed which compares the image to other related images. For example, images can be related based on time (e.g., the images were taken sequentially) or during the same event (e.g., specified as being related by a user). Scene analysis module 314 can determine a type of scene associated with an image and compare it to the types of scenes associated with related images. For example, an image that includes a person or group of people can be classified as a "portrait" while an image of a mountain or a coastline can be classified as a "landscape". These are merely examples of types of scenes, other types (e.g., "sports", "pets", "weddings", etc.) can also be used. After an image's scene type has been determined, it can be compared to the scene types of related images. In some embodiments, images with a scene type that is different from the related images (such as a portrait image that is related to many landscape images) can be assigned a higher score. As described further below, in some embodiments, the scene type can be used independently of the image score to select multiple representative images for an event. For example, where two images associated with an event have scores higher than a threshold value, and each image is of a different scene type, both images can be used as representative images.

As described above, activity analysis module 318 can monitor how users of online content management service 300 interact with images stored in image database 302. For example, each time a request for an image is received at image database 302, the activity analysis module can keep a record of the request. In some embodiments, the activity analysis module can track which users have requested the image, the type of client device from which the request was received, and whether the request was received through a shared link. The activity analysis module can identify popular images based on the detected activity and identify common features between the popular images. Using these common features, activity analysis module 318 can generate a predictive activity model which can be used to score subsequent images. For example, when a new image is uploaded and analyzed by image analyzer 304, the feature scores can be compared to the predictive activity model. Images that have similar feature scores to previously popular images can receive a higher score.

In some embodiments, each image analysis module can be trained to score images according to a particular user's preferences. The training process can provide the user with options that describe why the user likes or dislikes the image or the user can be presented with the option of ranking each image.

Based on the scores from each module in image analyzer 304, image score calculator 320 can calculate a composite score, recommend actions to the user based on the composite score, and update scoring modules based on feedback received from the user related to the composite score.

Composite score calculator 322 can include a scoring model that receives as input scores from each feature module and outputs a composite score based on the feature scores. In some embodiments, the scoring model can be a weighted sum of the scores, where each feature score is weighted and then the weighted feature scores are summed to determine a composite score. The weight applied to each feature score can be set to a default value for each user at sign up. In some embodiments, each feature score weight can be determined based on feedback from users. Feedback can be obtained during the course of use. For example, as users share, "like", or otherwise interact with the images, those images that receive the most interaction can be analyzed and the features that are shared by these images can receive a higher weight.

Additionally, or alternatively, when a user signs up with online content management service 300, a training process can be invoked in which images (e.g., a selection of images from the user's image database, or a set of training images selected by online content management service 300) are presented to the user and the user indicates whether they like or dislike each image. The training process can provide the user with options that describe why the user likes or dislikes the image or the user can be presented with the option of ranking each image. Based on the training feedback, a set of coefficients can be determined for the user and a personalized scoring model created. In some embodiments, a global scoring model can be created based on a composite of each user's (or a subset of users) personalized scoring model. Thereafter, the global scoring model can be used as the default scoring model for new users.

Action engine 324 can send instructions or recommended actions to a client device based on a composite score calculated for an image. Recommended actions can include actions that will improve the score of a given image. For example, when images are scored in real-time, if the subject of the image is off-center, blurry, or if the subject's eyes are closed, the recommended action can include retaking the image. Similarly, if the activity analysis module 318 scores the image highly, the recommended action can be to share the image.

Scoring update module 326 can receive feedback changes to the scores of images. For example, a user can select an image displayed on a client device and manually enter a new score. Image database 302 can receive the new score and update the score associated with the image. In some embodiments, a user can change the score of an image indirectly, by reordering images that are sorted by score. For example, a user can select and image and move it to a different position (e.g., by a drag-and-drop, tap and swipe, or other input). The score of the image can then be increased or decreased based on its change in position.

Figure 4A:
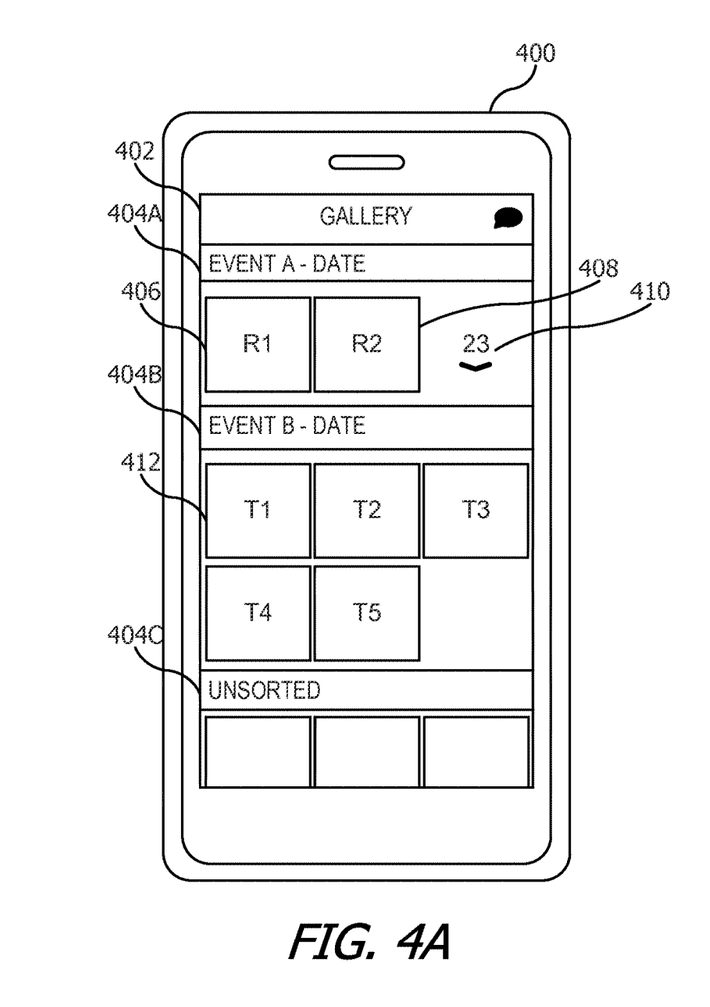
FIGS. 4A-4B show examples of organizing and displaying content items on a mobile device according to an embodiment of the present invention.
Figure 4B:
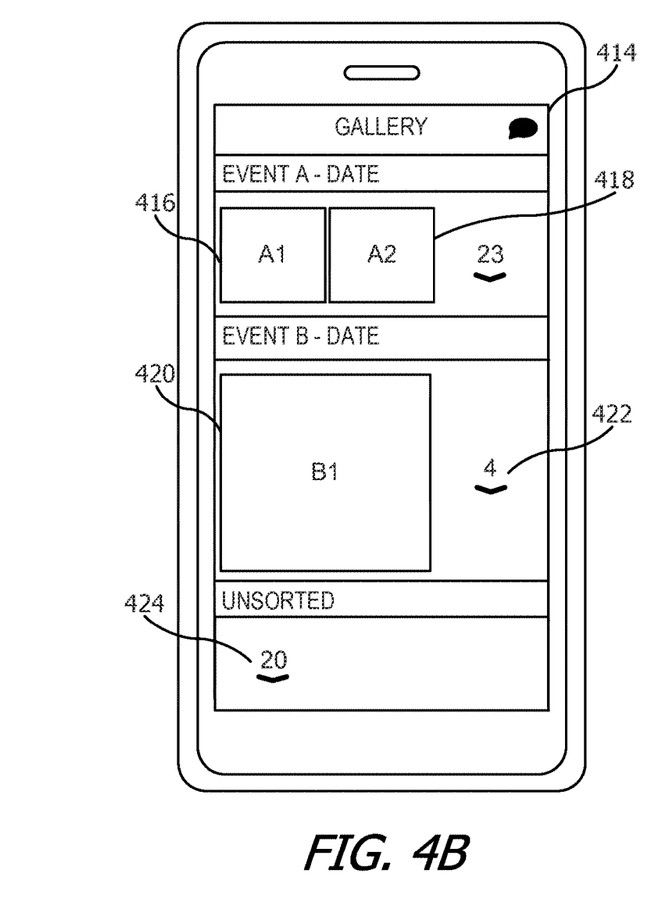

FIGS. 4A-4B show examples of organizing and displaying content items on a mobile device according to an embodiment of the present invention. Mobile device 400 includes a user interface 402 through which a user can view and interact with images stored in an online content management service. User interface 402 shows a traditional gallery view of the user's images sorted by events 404A, 404B, and 404C. As such, the images associated with each event can be randomly selected, based on timestamps, or otherwise ordered without analyzing the images to determine whether they are representative of the events. For example, Event A 404A includes two randomly selected images R1 406 and R2 408. Event A 404A also includes additional unshown images as indicated by icon 410, which indicates there are an additional 23 images associated with Event A 404A. Because the images shown for Event A 404A are randomly selected, there is no way to know whether they are representative of the remaining 23 images. Similarly, Event B 404B is shown to include five images 412. Images 412 (T1-T5) are shown in the temporal order in which the images were uploaded. As shown in user interface 402, the user's remaining images are not associated with an event and are indicated as being unsorted 404C. These unsorted images, as in Event A 404A and Event B 404B, can be randomly selected or arranged merely in the order in which they were uploaded.

In accordance with an embodiment of the invention, user interface 414 is configured to display images associated with each event based on the score associated with the images. For example, the two images associated with Event A, A1 416 and A2 418, can be the two highest scoring images of the 25 images associated with Event A. In some embodiments, A1 416 can be the highest scoring image associated with a first type of scene (such as portrait images) and A2 418 can be the highest scoring image associated with a second type of scene (such as landscape images). Similarly, when the images associated with Event B are analyzed, B1 420 can be determined to have the highest score. As shown in FIG. 4, B1 420 can be the only image associated with Event B with a score higher than a threshold value. As such, only B1 420 is shown. A user can choose to view the remaining images associated with Event B by selecting icon 422. Threshold scores can be used to determine how images are displayed and image layouts can be selected by the online content management service, based on the client device type, or by the client device. In some embodiments, different image layouts may be available based on the number of images associated with an event and/or based on the scores of all of the images associated with an event. For example, where several images are associated with scores greater than a threshold value, each of the images can be displayed. In some embodiments, depending on the client device in use, a limited number of the images greater than the threshold can be displayed. For example, a smartphone can limit the displayed images to three, whereas a tablet computer having a larger screen can allow for five images to be displayed. When no images have a score greater than a threshold, no images can be displayed as representative. For example, as shown in FIG. 4, none of the images associated with unsorted scored higher than a threshold. As such, an icon 424 is displayed instead, which the user can select to view those images.

Although references are made herein to the "highest" score as being the image selected for display, various scoring schemes can be used. For example, an inverse of a score, or a negative score can be used in which the lower score values indicate more desirable or representative content items.

Examples of processes that can be implemented to provide event-based image classification and scoring will now be described. In some embodiments, these processes, or portions thereof, can be implemented in any of clients 110-116 or 202, or online content management service 100, 200, or 300 of FIGS. 1-3.

Figure 5:
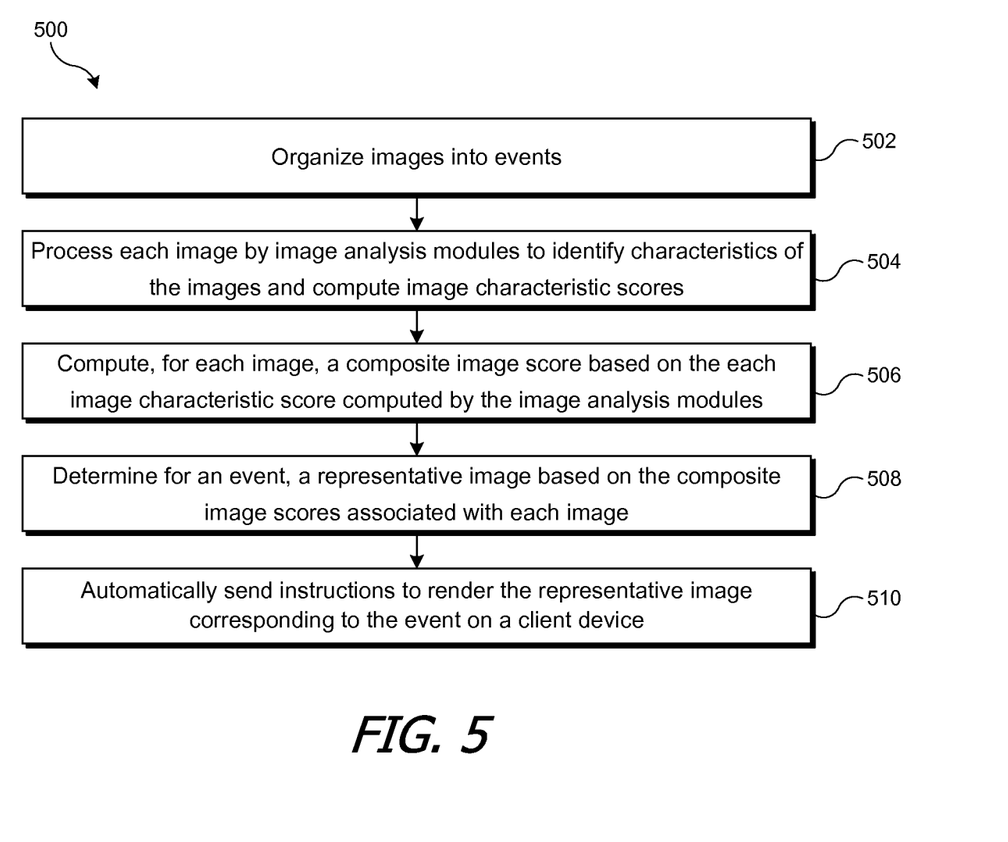
FIG. 5 is a flow diagram of a process for image classification and scoring according to an embodiment of the present invention.

FIG. 5 is a flow diagram of a process 500 for image classification and scoring according to an embodiment of the present invention. At block 502, images stored in an online content management service can be organized into events. In some embodiments, images can be organized into events based on image metadata, such as timestamps or location data, or can be manually organized by a user based on how the images have been stored. For example, all images stored in a folder can be organized as a single event having the same name as the folder. At block 504, each image can be processed by image analysis modules to identify image characteristics and compute image characteristic scores. As described above, each image analysis module can be trained to detect and score a different feature of an image. For example, there can be several object detection modules that are each trained to detect a different object (faces, pets, food, etc.). In some embodiments, one image analysis module can invoke additional image analysis modules to further process an image. For example, if an object detection module successfully detects an object in an image, the object detection module can then call an object analysis module to further analyze the detected object.

At block 506, a composite image score can be computed based on the image characteristic scores. As described above, an image scoring model can be used to compute the composite image score. In some embodiments, the image scoring model can include a weighted sum, where each image characteristic score is multiplied by a corresponding coefficient and the resulting weighted image characteristic scores are added together to produce a composite image score. Alternative models can also be used to compute a composite image score, such as non-linear models, decision trees, and other models. At block 508, a representative image, or images, can be determined for a given event based on the composite image scores calculated for each image in the event. For example, the representative image can be the image with the highest composite score in the event. In some embodiments, a threshold score can be set such that the representative image is the image having the highest composite image score above a threshold score. At block 510, an instruction can be sent to a client device to render an interface that includes the representative image for the event. The instruction can be in response to a request from the client device for a gallery view of the user's images. If an event does not include an image having a composite score above a threshold score, the instruction may not include a representative image displayed. Instead, the instruction can include a link to view the entire event. This can simplify the user interface by reducing the number of images that need to be navigated by the user, making it easier for the user to ignore low scoring images and more quickly navigate to higher scoring images.

Figure 6:
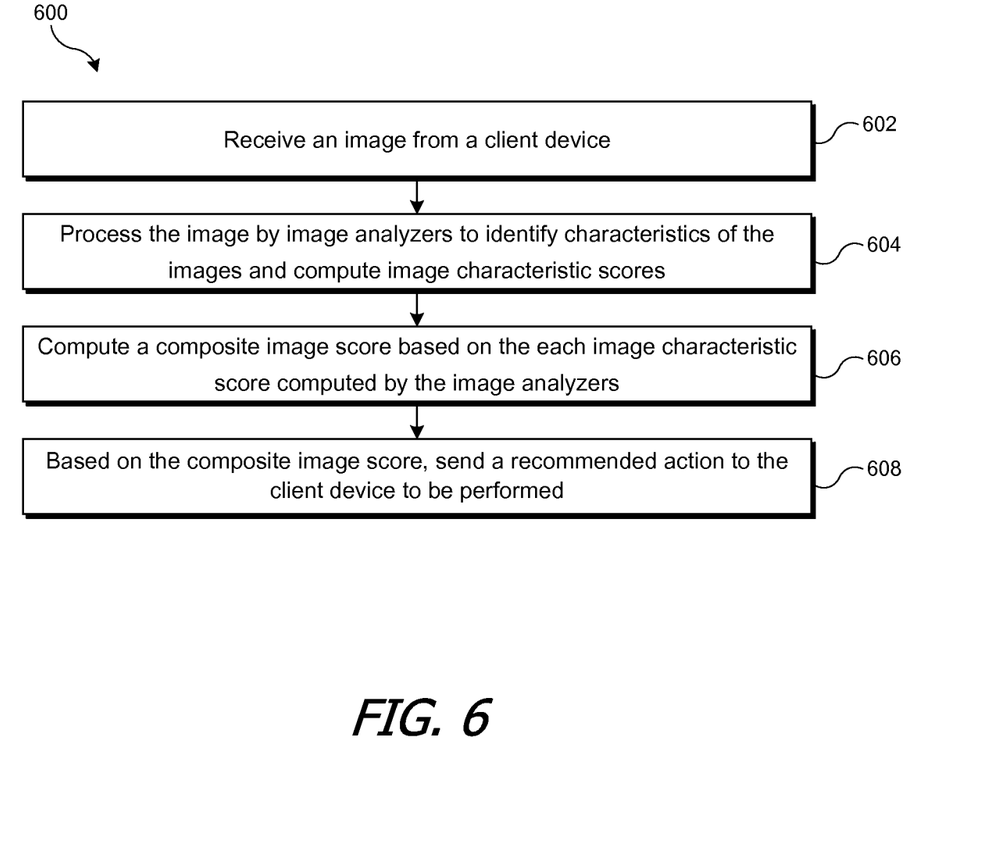
FIG. 6 is a flow diagram of a process for determining actions to be performed based on image scores calculated in real-time according to an embodiment of the present invention.

Process 500 (or portions thereof) can be performed automatically as each image is uploaded, in batch processing during times of low processing demands, and/or periodically to keep image scored up to date in view of evolving image scoring models. As described above, scoring images in real-time, as the images are captured by a client device, can provide users with feedback as to the quality of their images and recommendations for taking higher scoring images. FIG. 6 is a flow diagram of a process 600 for determining actions to be performed based on image scores calculated in real-time according to an embodiment of the present invention.

At block 602, an online content management service can receive an image from a client device. The image can be captured by the client device (e.g., using a camera integrated into the client device) and automatically uploaded to the online content management service. In some embodiments, the image can be captured using a camera app that is provided by the online content management service. The image can be stored by the online content management service in a cache, buffer, or other temporary memory for processing, rather than being stored in an image database. At block 604, the image can be processed in real-time by the image analysis modules described above. At block 606, a composite score can be calculated for the image. At block 608, based on the composite score, a recommendation message can be sent to the client device. For example, if the composite score is below a threshold, the recommendation message can be to try capturing the image again (e.g., if the image is blurry, the subject's eyes are closed, etc.). Similarly, if the composite score is above a threshold, the recommendation message can be to share the image with other users. Other actions can also be recommended. For example, if a face detection module determines the identity of a person in the image as another user of the online content management service, the recommendation message can be to share the image with the identified person. Also, a recommendation action to retake an image can indicate why the image scored low and how it can be corrected. For example, if the image is too dark, the recommendation message can suggest that the user retake the image and turn on the client device flash. In some embodiments, the image composite score can be compared to other images in the user's collection and a recommended action can be made.

In some embodiments, image scores can be used to improve user experience in areas other than displaying selected images. For example, image scores can serve as a default sort order for search results. Scores can also be used to sort images or other content items to simplify the management of content items stored in an online content management service. For example, if a user has a limited amount of storage space, content items can be sorted according to the score, enabling the user to quickly identify low scoring (and therefore likely low value) content items. The user can then more quickly remove these content items, freeing up additional storage space. Additionally, in some embodiments, image scores can be applied to frames of video content items to select a representative thumbnail for the video. Each frame (or a periodic selection of frames, such as every i frame) can be extracted from the video content item and scored. The frame having the highest score can then be selected as the thumbnail for the video content item.

Some of the examples described above can assume that an online content management service classifies and scores content items, and instructs a client device to render an interface that organizes the content items according to the scores. However, similar functionality can be implemented by a client device or client application program, without requiring the use of an online content management service. Functionality can also be distributed across client devices and an online content management service. For example, in some embodiments, real time processing can be provided by a client device, whereas collection analysis can be provided by an online content management service.

Figure 7:
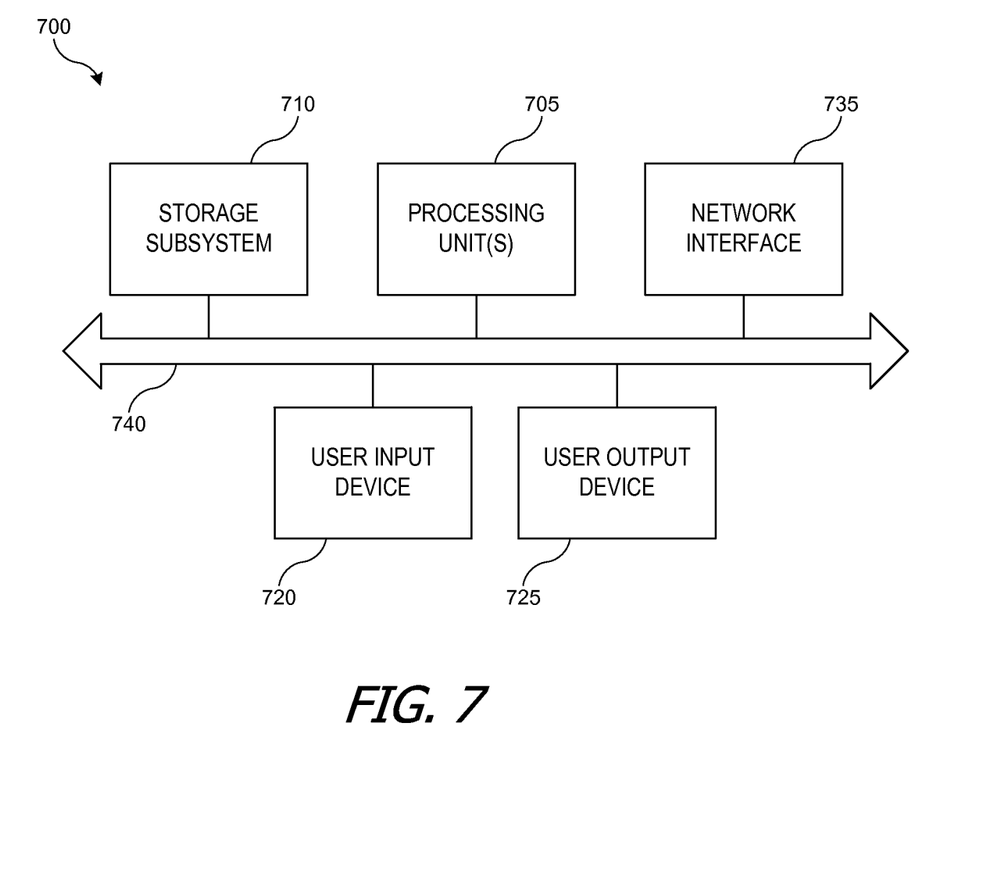
FIG. 7 shows a simplified block diagram of a representative computer system that can be used in an embodiment of the present invention.

Various operations described herein can be implemented on computer systems, which can include systems of generally conventional design. FIG. 7 shows a simplified block diagram of a representative computer system 700. In various embodiments, computer system 700 or similar systems can implement a user device (e.g., any of clients 110-116 of FIG. 1) and/or a server system (e.g., servers implementing all or part of online content management service 104 of FIG. 1). Computer system 700 can include processing unit(s) 705, storage subsystem 710, input devices 720, output devices 725, network interface 735, and bus 740.

Processing unit(s) 705 can include a single processor, which can have one or more cores, or multiple processors. In some embodiments, processing unit(s) 705 can include a general-purpose primary processor as well as one or more special-purpose co-processors such as graphics processors, digital signal processors, or the like. In some embodiments, some or all processing units 705 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 705 can execute instructions stored in storage subsystem 710.

Storage subsystem 710 can include various memory units such as a system memory, a read-only memory (ROM), and a permanent storage device. The ROM can store static data and instructions that are needed by processing unit(s) 705 and other modules of computer system 700. The permanent storage device can be a read-and-write memory device. This permanent storage device can be a non-volatile memory unit that stores instructions and data even when computer system 700 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 705 need at runtime.

Storage subsystem 710 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 710 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 710 can store one or more software programs to be executed by processing unit(s) 705, such as an operating system, a messaging client application, and so on. "Software" refers generally to sequences of instructions that, when executed by processing unit(s) 705, cause computer system 700 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 705. Software can be implemented as a single program or a collection of separate programs or program modules that interact as desired. From storage subsystem 710, processing unit(s) 705 can retrieve program instructions to execute and data to process in order to execute various operations described herein.

A user interface can be provided by one or more user input devices 720 and one or more user output devices 725. Input devices 720 can include any device via which a user can provide signals to computer system 700; computer system 700 can interpret the signals as indicative of particular user requests or information. In various embodiments, input devices 720 can include any or all of a keyboard, track pad, touch screen, mouse or other pointing device, scroll wheel, click wheel, dial, button, switch, keypad, microphone, and so on.

User output devices 725 can include any device via which computer system 700 can provide information to a user. For example, user output devices 725 can include a display to display images generated by computer system 700. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 725 can be provided in addition to or instead of a display. Examples include indicator lights, speakers, tactile "display" devices, printers, and so on.

In some embodiments, input device 720 and output devices 725 can interoperate to provide a graphical user interface ("GUI") that allows a user to interact with computer system 700 by using an input device to select a control element displayed on the screen (e.g., by operating a pointing device such as a mouse or touching the location where a control element is displayed on a touch screen).

Network interface 735 can provide voice and/or data communication capability for computer system 700, including the ability to communicate with various messaging services and/or message management services to access and act upon messages. In some embodiments, network interface 735 can include radio frequency (RF) transceiver components for accessing wireless voice and/or data networks (e.g., using cellular telephone technology, advanced data network technology such as 3G, 4G or EDGE, Wi-Fi (IEEE 802.11 family standards), or other mobile communication technologies, or any combination thereof), GPS receiver components, and/or other components. In some embodiments, network interface 735 can provide wired network connectivity (e.g., Ethernet) in addition to or instead of a wireless interface. Network interface 735 can be implemented using a combination of hardware (e.g., antennas, modulators/demodulators, encoders/decoders, and other analog and/or digital signal processing circuits) and software components.

Bus 740 can include various system, peripheral, and chipset buses that communicatively connect the numerous components of computer system 700. For example, bus 740 can communicatively couple processing unit(s) 705 with storage subsystem 710. Bus 740 can also connect to input devices 720 and output devices 725. Bus 740 can also couple computing system 700 to a network through network interface 735. In this manner, computer system 700 can be a part of a network of multiple computer systems (e.g., a local area network (LAN), a wide area network (WAN), an intranet, or a network of networks, such as the Internet. In some embodiments, bus 740 and network interface 735 can operate to connect any number of computers together to provide large-scale computing capacity (e.g., server farms) that can communicate with clients through a WAN interface (which can be part of network interface 735).

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 705 can provide various functionality for computer system 700. For example, where computer system 700 implements a client device, processing unit(s) 705 can execute a messaging client app that provides an interface operable by the user to interact with messages, including, e.g., any or all of the interface screens described above. Where computer system 700 implements a server (e.g., part or all of online content management service 100 of FIG. 1), processing unit(s) 705 can execute server applications that receive and respond to client requests and perform other operations described herein as being performable by a server or service.

It will be appreciated that computer system 700 is illustrative and that variations and modifications are possible. Computer system 700 can have other capabilities not specifically described here (e.g., mobile phone, global positioning system (GPS), power management, one or more cameras, various connection ports for connecting external devices or accessories, etc.). Further, while computer system 700 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   identifying a default scoring model trained to score images based on coefficients reflecting user preferences of multiple users;
   receiving, from a client device, indications of user selections by a particular user indicating user preferences of images having a first visual image characteristic corresponding to a first scene type and images having a second visual image characteristic corresponding to a second scene type, the second scene type differing from the first scene type;
   based on the indications of user selections, modifying the default scoring model to generate a personalized scoring model comprising adjusted coefficients for the particular user reflecting the user preferences of images having the first visual image characteristic and images having the second visual characteristic;
   identifying, from among a plurality of images corresponding to an event, a first image having the first visual image characteristic and a second image having the second visual image characteristic;
   determining a first composite image score for the first image based on the first visual image characteristic and a second composite image score for the second image based on the second visual characteristic according to the adjusted coefficients of the personalized scoring model; and
   based on the personalized scoring model, the first composite image score for the first image score, and the second composite image score for the second image score, selecting, for display within a user interface of the client device, the first image as a first representative image corresponding to the first scene type for the event and the second image as a second representative image corresponding to the second scene type for the event.

2. The method of claim 1, wherein:
   receiving the indications of user selections indicating the user preferences of images having the first visual image characteristic corresponding to the first scene type comprises receiving indications of user preferences of images corresponding to a portrait scene type; and
   receiving the indications of user selections indicating the user preferences of images having the second visual image characteristic corresponding to the second scene type comprises receiving indications of user preferences of images corresponding to a landscape scene type.

3. The method of claim 1, wherein determining the first composite image score for the first image based on the first visual image characteristic according to the adjusted coefficients of the personalized scoring model comprises weighting the first composite image score for the first image according to the adjusted coefficients of the personalized scoring model.

4. The method of claim 1, further comprising:
   classifying the first image as corresponding to the first scene type based on visual image characteristics of the first image;
   classifying the second image as corresponding to the second scene type based on visual image characteristics of the second image;
   comparing the first composite image score for the first image to composite image scores for images corresponding to the first scene type from the plurality of images;
   comparing the second composite image score for the second image to composite image scores for images corresponding to the second scene type from the plurality of images; and
   based on comparing the first composite image score and the second composite image score to composite image scores for images corresponding to the first scene type and the second scene type from the plurality of images, selecting the first image as the first representative image corresponding to the first scene type and the second image as the second representative image corresponding to the second scene type.

5. The method of claim 4, wherein:
   classifying the first image comprises classifying the first image as corresponding to a portrait scene type based on detecting a person depicted in the first image; and
   classifying the second image comprises classifying the second image as corresponding to a landscape scene type based on detecting geographic characteristics in the second image.

6. The method of claim 1, wherein receiving the indications of user selections by the particular user indicating the user preferences of images comprises receiving a reordering by the particular user of an additional plurality of images corresponding to an additional event.

7. The method of claim 1, wherein receiving the indications of user selections by the particular user indicating the user preferences of images comprises:
   receiving a first indication via a social media service that the particular user likes at least one image having the first visual image characteristic; and receiving a second indication via the social media service that the particular user likes at least one image having the second visual image characteristic.

8. The method of claim 1, wherein selecting, for display within the user interface of the client device, the first image as the first representative image corresponding to the first scene type for the event and the second image as the second representative image corresponding to the second scene type for the event comprises causing the client device to present within the user interface:
 the first representative image as a first thumbnail;
 the second representative image as a second thumbnail; and
 a selectable option associated with the first thumbnail or the second thumbnail that, upon selection, causes display of one or more of the plurality of images corresponding to the event.

9. A system comprising:
 at least one processor; and
 at least one non-transitory computer-readable storage medium comprising instructions that, when executed by the at least one processor, cause the system to:
  identify a default scoring model trained to score images based on coefficients reflecting user preferences of multiple users;
  receive, from a client device, indications of user selections by a particular user indicating user preferences of images having a first visual image characteristic corresponding to a first scene type and images having a second visual image characteristic corresponding to a second scene type, the second scene type differing from the first scene type;
  based on the indications of user selections, modify the default scoring model to generate a personalized scoring model comprising adjusted coefficients for the particular user reflecting the user preferences of images having the first visual image characteristic and images having the second visual characteristic;
  identify, from among a plurality of images corresponding to an event, a first image having the first visual image characteristic and a second image having the second visual image characteristic;
  determine a first composite image score for the first image based on the first visual image characteristic and a second composite image score for the second image based on the second visual characteristic according to the adjusted coefficients of the personalized scoring model; and
  based on the personalized scoring model, the first composite image score for the first image score, and the second composite image score for the second image score, select, for display within a user interface of the client device, the first image as a first representative image corresponding to the first scene type for the event and the second image as a second representative image corresponding to the second scene type for the event.

10. The system of claim 9, further comprising instructions that, when executed by the at least one processor, cause the system to determine the first composite image score for the first image based on the first visual image characteristic according to the adjusted coefficients of the personalized scoring model by weighting the first composite image score for the first image according to the adjusted coefficients of the personalized scoring model.

11. The system of claim 9, further comprising instructions that, when executed by the at least one processor, cause the system to:
 classify the first image as corresponding to the first scene type based on visual image characteristics of the first image; and
 classify the second image as corresponding to the second scene type based on visual image characteristics of the second image;
 compare the first composite image score for the first image to composite image scores for images corresponding to the first scene type from the plurality of images;
 compare the second composite image score for the second image to composite image scores for images corresponding to the second scene type from the plurality of images; and
 based on comparing the first composite image score and the second composite image score to composite image scores for images corresponding to the first scene type and the second scene type from the plurality of images, select the first image as the first representative image corresponding to the first scene type and the second image as the second representative image corresponding to the second scene type.

12. The system of claim 9, further comprising instructions that, when executed by the at least one processor, cause the system to receive the indications of user selections by the particular user indicating the user preferences by:
 receiving a first indication via a social media service that the particular user likes at least one image having the first visual image characteristic; and
 receiving a second indication via the social media service that the particular user likes at least one image having the second visual image characteristic.

13. The system of claim 9, further comprising instructions that, when executed by the at least one processor, cause the system to:
 receive the indications of user selections indicating the user preferences of images having the first visual image characteristic corresponding to the first scene type by receiving indications of user preferences of images corresponding to a portrait scene type; and
 receive the indications of user selections indicating the user preferences of images having the second visual image characteristic corresponding to the second scene type by receiving indications of user preferences of images corresponding to a landscape scene type.

14. The system of claim 9, further comprising instructions that, when executed by the at least one processor, cause the system to select, for display within the user interface of the client device, the first image as the first representative image corresponding to the first scene type for the event and the second image as the second representative image corresponding to the second scene type for the event by causing the client device to present within the user interface:
 the first representative image as a first thumbnail;
 the second representative image as a second thumbnail; and
 a selectable option associated with the first thumbnail or the second thumbnail that, upon selection, causes display of one or more of the plurality of images corresponding to the event.

15. A non-transitory computer readable medium comprising instructions thereon that, when executed by at least one processor, cause a computer system to:

identify a default scoring model trained to score images based on coefficients reflecting user preferences of multiple users;

receive, from a client device, indications of user selections by a particular user indicating user preferences of images having a first visual image characteristic corresponding to a first scene type and images having a second visual image characteristic corresponding to a second scene type, the second scene type differing from the first scene type;

based on the indications of user selections, modify the default scoring model to generate a personalized scoring model comprising adjusted coefficients for the particular user reflecting the user preferences of images having the first visual image characteristic and images having the second visual characteristic;

identify, from among a plurality of images corresponding to an event, a first image having the first visual image characteristic and a second image having the second visual image characteristic;

determine a first composite image score for the first image based on the first visual image characteristic and a second composite image score for the second image based on the second visual characteristic according to the adjusted coefficients of the personalized scoring model; and based on the personalized scoring model, the first composite image score for the first image score, and the second composite image score for the second image score, select, for display within a user interface of the client device, the first image as a first representative image corresponding to the first scene type for the event and the second image as a second representative image corresponding to the second scene type for the event.

16. The non-transitory computer readable medium of claim 15, further comprising instructions that, when executed by the at least one processor, cause the computer system to determine the first composite image score for the first image based on the first visual image characteristic according to the adjusted coefficients of the personalized scoring model by weighting the first composite image score for the first image according to the adjusted coefficients of the personalized scoring model.

17. The non-transitory computer readable medium of claim 15, further comprising instructions that, when executed by the at least one processor, cause the computer system to:

receive the indications of user selections indicating the user preferences of images having the first visual image characteristic corresponding to the first scene type by receiving indications of user preferences of images corresponding to a sports scene type; and receive the indications of user selections indicating the user preferences of images having the second visual image characteristic corresponding to the second scene type by receiving indications of user preferences of images corresponding to a pets scene type.

18. The non-transitory computer readable medium of claim 15, further comprising instructions that, when executed by the at least one processor, cause the computer system to:

classify the first image as corresponding to the first scene type based on visual image characteristics of the first image;

classify the second image as corresponding to the second scene type based on visual image characteristics of the second image;

compare the first composite image score for the first image to composite image scores for images corresponding to the first scene type from the plurality of images;

compare the second composite image score for the second image to composite image scores for images corresponding to the second scene type from the plurality of images; and based on comparing the first composite image score and the second composite image score to composite image scores for images corresponding to the first scene type and the second scene type from the plurality of images, select the first image as the first representative image corresponding to the first scene type and the second image as the second representative image corresponding to the second scene type.

19. The non-transitory computer readable medium of claim 18, further comprising instructions that, when executed by the at least one processor, cause the computer system to:

classify the first image by classifying the first image as corresponding to a portrait scene type based on detecting a person depicted in the first image; and classify the second image by classifying the second image as corresponding to a landscape scene type based on detecting geographic characteristics in the second image.

20. The non-transitory computer readable medium of claim 15, further comprising instructions that, when executed by the at least one processor, cause the computer system to select, for display within the user interface of the client device, the first image as the first representative image corresponding to the first scene type for the event and the second image as the second representative image corresponding to the second scene type for the event comprises by causing the client device to present within the user interface:

the first representative image as a first thumbnail;

the second representative image as a second thumbnail; and a selectable option associated with the first thumbnail or the second thumbnail that, upon selection, causes display of one or more of the plurality of images corresponding to the event.

* * * * *